United States Patent [19]

Kikuchi

[11] 4,232,939
[45] Nov. 11, 1980

[54] SCREEN WITH HIGH LUMINANCE AND WIDE ANGLE

[76] Inventor: Tomoo Kikuchi, 12-35, Shimoochiai 3-chome, Shinjuku-ku, Tokyo, Japan

[21] Appl. No.: 25,235

[22] Filed: Mar. 29, 1979

[30] Foreign Application Priority Data

Jan. 4, 1978 [JP] Japan .................... 53-038592

[51] Int. Cl.³ .......................... G03B 21/60
[52] U.S. Cl. .................... 350/129; 350/125
[58] Field of Search ............... 350/129, 125

[56] References Cited

U.S. PATENT DOCUMENTS

| 3,811,750 | 5/1974 | Coulthard | 350/129 X |
| 4,089,587 | 5/1978 | Schudel | 350/129 X |

FOREIGN PATENT DOCUMENTS

| 138904 | 2/1947 | Australia | 350/129 |
| 624772 | 6/1949 | United Kingdom | 350/129 |

Primary Examiner—Richard A. Wintercorn
Attorney, Agent, or Firm—James Creighton Wray

[57] ABSTRACT

This invention relates to a reflector type screen suitable for use in a daylight room and which provides high luminance and a wide range of diffusion, wherein a specular surface is provided by an aluminum coating formed by vacuum evaporation on one side of a base plate of a transparent thermoplastic resin, and said specular surface is lined with a thin sheet of a flexible synthetic resin such as polyvinyl chloride thereby to protect the specular surface and to facilitate the subsequent processing. A transparent diffusing specular layer having a sandblast surface is formed on the other side of the base plate, and then lenticulars having a convex surface are formed in continuous rows by rolling with due caution not to damage the sandblast surface. The diffusing layer is prepared to have relatively low diffusing performance, e.g. 10 to 20%, thereby providing high luminance for viewers and a wide range of diffusion in the transverse direction.

5 Claims, 5 Drawing Figures

Relative Reflective Luminance

SCREEN WITH HIGH LUMINANCE AND WIDE ANGLE

In the screen of the present invention, aluminum mirror surface and a diffusing specular layer of low diffusing performance are disposed with a transparent base plate inbetween, whereby the diffusing performance of the diffusing specular layer can be adjusted as desired while the reflection performance of the mirror surface is constant.

The screen of the present invention may be made with a curvature in a vertical direction as shown in FIG. 3, so that the reflected light is concentrated towards viewers and still higher luminance is obtained. The curvature of the convex surface of the lenticulars of the screen of the present invention is determined by the distance between the screen and viewers. The surface of the screen of the present invention is prepared by roll shaping a thermoplastic resin such as polyethylene, and therefore any stains thereon may simply be removed with a detergent or benzine without damaging the screen. In this respect, the screen of the present invention is more advantageous and can more easily be handled than Ektalite screen which is susceptible to colour change and damage by cleaning.

Further, the screen of the present invention is suitable for use in a daylight room since it provides high luminance and a wide range of diffusion. As described with reference to FIG. 4, the procedure for its production is simple and suitable for mass production, and it is possible to manufacture products of uniform quality economically.

1—Lenticular base plate
2—Aluminum specular surface
4—Diffusing specular surface
5—Convex lenticular surface

DETAILED DESCRIPTION OF THE INVENTION

An embodiment of the present invention is described hereinafter with reference to the accompanying drawings.

Figure 4:
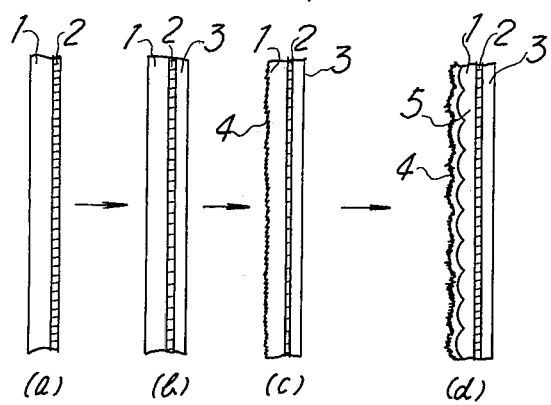
FIG. 4 illustrates a procedure for producing the screen of the present invention.

Reference numeral 1 designates a base plate of a lenticular sheet which is made of a thin sheet of a thermoplastic resin such as polyethylene, and numeral 2 designates a highly reflective metal coating formed on one side of the base plate, e.g. aluminum coating formed by vacuum evaporation (see FIG. 4(a)). Numeral 3 designates a thin sheet of a synthetic resin, e.g. a polyvinyl chloride sheet, lined on the coating surface for the protection of the metal coating 2 (see FIG. 4(b)). Such a lining also serves to support the base plate for subsequent processing and shaping as the lenticular sheet used for the base plate 1 is usually very thin. Numeral 4 designates a diffusing specular layer formed on the front side of the base plate 1, which, according to the embodiment of the present invention, is formed by rolling with a roller having a finely sandblasted surface (see FIG. 4(c)). Numeral 5 designates convex lenticulars which are formed, for instance, by rolling. In this rolling operation, care must be taken not to destroy the finely sandblasted surface of the diffusing specular layer formed by the preceding step, by the rolling pressure from the rollers. Said diffusing specular layer may be formed, other than by means of rolling, by spraying a clear lacquer or the like.

The function of the screen of the present invention will now be described.

A luminous flux (A, A') projected from the light source of a projector reaches the area of the convex lenticular surface 5 and a part of it is reflected, by the diffusing specular surface 4 formed on the convex lenticular surface 5, in various directions to form diffused reflection light (B, B'). The remaining part of the projected luminous flux passes through the base plate 1 without absorption loss, as the diffusing specular surface 4 is formed integrally with the base plate and therefore has excellent light transmitting efficiency, and focuses on the specular surface 2, then passes again through the base plate 1 and returns to front viewers. A part of the returning light is diffusingly reflected by the diffusing specular surface 4.

Thus, the luminous flux (A, A') is diffusingly reflected twice, as shown by the diffused reflection light (B, B') and (C, C'), in a direction perpendicular to the vertical lines of the lenticulars 5. As the lenticulars are disposed side by side in a transverse direction, a wide diffusion angle in a transverse direction is attained and thereby a high diffusion luminance is obtained.

The diffusing specular layer 4 should have a relatively low diffusing effect so as to give high luminance for the front viewers and at the same time to attain wide diffusion in a transverse direction. Experiments show that when 10 to 20% of the projected luminous flux is diffusingly reflected, desirable results, i.e. wide angle diffusion and high luminance, are obtained.

Figure 5:
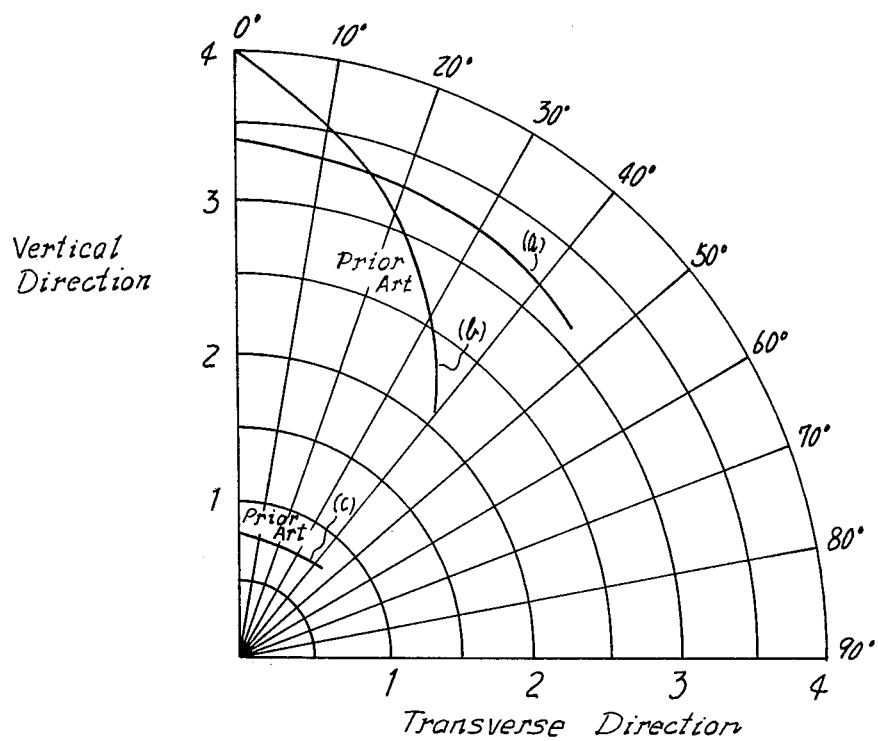
FIG. 5 is a graph showing the performance of the screen of the present invention.

FIG. 5 is a graph showing reflection luminance at various angles, as the results of the experiments. The vertical axis of the graph indicates relative reflection luminance in a vertical direction, while the horizontal axis indicates relative reflection luminance in a transverse direction. The curved line (a) in the graph shows the performance of the screen of the present invention, the curved line (b) shows the performance of Ektalite screen sold by Kodak Company and the curved line (c) shows the performance of a white mat screen. It is shown that the screen of the present invention presents high luminance in a wide range of angles, while with Ektalite screen, luminance decreases rapidly as the angle of viewing increases, and luminance with the white mat screen is very low.

OBJECTS OF THE INVENTION

It is an object of the present invention to provide a screen suitable for use in a daylight room and which provides high luminance and a wide range of diffusion.

It is another object of the present invention to provide a screen which provides high luminance and a wide range of diffusion, wherein a specular surface is provided by a thin coating of aluminum or the like which is formed on one side of a base plate by vacuum evaporation, said base plate being made of a transparent thermoplastic resin, said thin coating is lined with a thin sheet of a flexible synthetic resin such as polyvinyl chloride thereby to protect the thin specular surface and to facilitate the subsequent processing, a finely sandblasted surface is provided on the other side of the base plate opposite to the side on which the aluminum thin coating is formed, thereby forming a light transmitting, diffusing specular surface, and the diffusing specular surface is formed by rolling into a continuous lenticulars having a convex surface.

Another object of the present invention is to provide a screen wherein an aluminum specular surface and a diffusing layer are disposed with a transparent base plate inbetween so that the reflection performance of the specular surface is constant while the diffusion performance of the diffusing specular layer may be controlled as desired.

It is a further object of the present invention to provide a screen which is curved in a vertical direction so that the reflected light is concentrated towards viewers.

It is another object of the present invention to provide a screen wherein its surface is prepared by roll shaping a thermoplastic resin such as polyethylene thereby to prevent abrasion at the time of cleaning.

It is still another object of the present invention to provide a screen with high luminance and wide diffusion performance, the procedure for the production of which is simple.

BACKGROUND OF THE INVENTION

Figure 1:
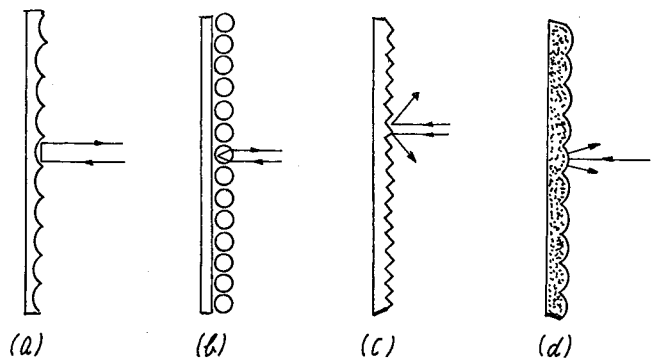
FIG. 1 shows conventional screens.
Figure 2:
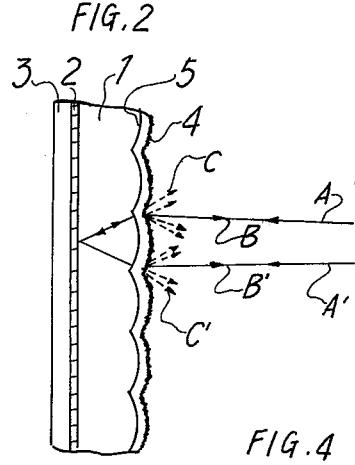
FIG. 2 shows a screen of the present invention illustrating its function.
Figure 3:
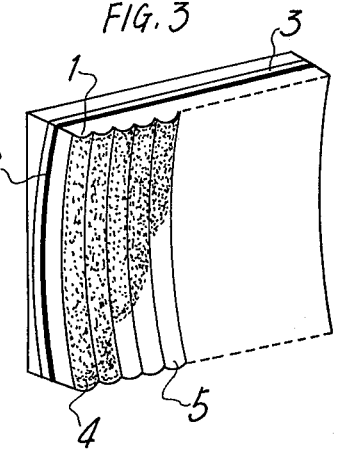
FIG. 3 is a perspective view of an embodiment of the screen of the present invention.

Screens suitable for use in a daylight room are known as shown in FIG. 1; a screen wherein parabolic, round concaves are arranged over the entire area of the screen (FIG. (*a*)), another screen wherein beads of glass or the like are disposed over the entire area of the screen (FIG. (*b*)), another screen wherein angular lenticulars are arranged side by side in a vertical direction of the picture plane (FIG. (*c*)) and still another screen wherein convex lenticulars are disposed in rows in a vertical direction of the picture plane and particles of translucent substance such as silica or mica are dispersed in the lenticulars. None of these screens has both functions of providing high luminance and giving a wide range of diffusion. The screens shown in FIGS. (*a*) and (*b*) give high reflection luminance to the front but their diffusion angle ranges are very narrow. The screen shown in FIG. (*c*) gives high diffusing luminance at an angle of 45° but its luminance to the front is low and therefore the projected image is not bright enough. The screen shown in FIG. (*d*) gives bright reflection luminance to the front by virtue of translucent substance dispersed in the lenticulars but gives sufficient brightness only up to a diffusion angle of 45° and the diffusion angle is relatively small. Thus, it has long been desired in this field to provide a screen for use in a daylight room which gives high reflection luminance to the front so as to present sufficiently bright projected image and which, at the same time, gives a wide range of diffusion angles.

I claim:

1. A screen with high luminance and wide diffusing performance which comprises: a base plate of a transparent thermoplastic resin sheet, a specular surface formed by vacuum evaporation on one side of the base plate, lenticulars formed on the other side of the base plate in continuous vertical rows and having convex surfaces, and a diffusing layer of low diffusing performance formed on the convex surfaces of said lenticulars.

2. The screen according to claim 1, wherein the lenticulars formed in continuous rows and having convex surfaces are curved in a vertical direction.

3. The method of forming a screen with wide diffusing performance which comprises providing a transparent thermoplastic resin sheet, vacuum evaporating a specular surface on one side of the resin sheet, forming lenticulars having convex surfaces in continuous vertical rows of the other side of the resin sheet and forming a diffusing layer of low diffusing performance on the convex surfaces of the lenticulars.

4. The method of claim 3 wherein the forming of the lenticulars further comprises curving the convex surfaces in a vertical direction.

5. The method of using a screen with high luminance and wide diffusing performance which comprises projecting light from a source through a diffusing layer of low diffusing performance and partially reflecting the light by the diffusing layer, passing the light which passes through the diffusing layer through convex lenticular surfaces arranged in continuous vertical rows, redirecting the light with the lenticular surfaces, passing the redirected light to a thermoplastic resin sheet having a specular surface formed by vacuum evaporation on a side thereof opposite the convex lenticular surfaces, reflecting the light from a sheet through the continuous lenticular surfaces and through the diffusing layer and diffusing a part of the reflected light by the diffusion layer.

* * * * *